United States Patent Office 3,573,263
Patented Mar. 30, 1971

3,573,263
POLYMERIZATION WITH A REDOX AND AZOISOBUTYRONITRILE CATALYST
Edward Arthur Gill, 17 Peasehill Close, Rawdon, England
No Drawing. Filed July 3, 1967, Ser. No. 650,640
Claims priority, application Great Britain, July 6, 1966,
30,431/66
Int. Cl. C08f 1/62, 1/78, 3/44
U.S. Cl. 260—79.3          9 Claims

ABSTRACT OF THE DISCLOSURE

A method of manufacturing water-soluble, very high molecular weight synthetic polymers, e.g. poly(acrylic acid), by polymerizing the monomer or monomers in aqueous solution using a polymerization initiator comprising a redox system, for example potassium persulphate/sodium sulphite, and an azo compound free-radical source, for example azobisisobutyronitrile.

BACKGROUND OF THE INVENTION

This invention relates to the manufacture of very high molecular weight, water-soluble synthetic polymers.

A common procedure when manufacturing water-soluble synthetic polymers, for example poly(acrylic acid), is to carry out the polymerization process in aqueous solution using a free-radical polymerization initiator. When preparing very high molecular weight synthetic polymers, i.e. polymers having molecular weights ranging from one million to one hundred million, which are water-soluble, there are certain desiderata which are generally taken into consideration and which include (a) the fact that the polymer should not comprise a cross-linked network, (b) the fact that the percentage of water in the polymer solution should be as low as possible in order to economise on subsequent drying costs, transport costs, plant capacity, etc., and (c) the fact that the free monomer content of the polymer solution should be as low as possible. In one method of manufacturing these very high molecular weight polymers the polymer solution produced takes the form of a gel which may have too high a viscosity to be stirred and cooled and which may therefore result in a substantial temperature rise during the polymerization process; for example, polymerization of a 25% by weight solution of acrylic acid results in a temperature rise of the order of 70° C. Heretofore in order to provide a free-radical polymerization initiator which can be used over such a wide temperature range there have been used redox systems. However, in processes using this type of initiator the desiderata outlined above are difficult to satisfy simultaneously since in order to produce a very high molecular weight material a low initiator concentration is required which tends to increase the free monomer content due to incomplete polymerization, and, in addition, the higher the solids content of the polymerization solution the higher is the final temperature and the components of many redox systems, for example a persulphate/sulphite system, react with the polymer at high temperatures to produce cross-linking.

SUMMARY OF THE INVENTION

It has now been discovered, in accordance with the present invention, that by the use of an initiator comprising a redox system and an azo compound free-radical source the three desiderata mentioned above can be achieved at the same time for polymeric materials obtained from an ethylenically-unsaturated monomer.

More particularly, in accordance with the present invention there is provided a method of manufacturing a water-soluble, very high molecular weight synthetic polymer, which comprises forming an aqueous solution containing one or more ethylenically-unsaturated monomers and a polymerization initiator comprising a redox system and an azo compound free-radical source, the redox system being present in the solution in a quantity which is insufficient by itself to complete the polymerization of the monomeric material present in said solution, and thereafter maintaining said solution under polymerization conditions for a time sufficient to complete the polymerization of the monomeric material present in the solution.

DESCRIPTION OF THE PREFERRED EMBODIMENTS

The ethylenically-unsaturated monomers which can be homopolymerized or copolymerized by the method of this invention are those which are soluble in water to a greater or lesser extent and include (a) acrylic monomers, for example acrylic acid, methacrylic acid, acrylamide and esters and salts of acrylic acid and methacrylic acid, (b) vinyl alkyl ethers and (c) vinyl sulphonic acid salts; examples of monomers falling within these three groups include, for example, acrylic acid, methacrylic acid, acrylamide, the alkyl and aminoalkyl esters of acrylic acid and methacrylic acid, e.g. methyl acrylate, ethyl acrylate, methyl methacrylate, ethyl methacrylate and diethylaminoethyl acrylate, mono esters of acrylic acid or methacrylic acid and a glycol, e.g. hydroxyethylmethacrylate, alkali metal and ammonium salts of acrylic acid and methacrylic acid, quaternary ammonium derivatives of aminoalkyl esters of acrylic acid and methacrylic acid, e.g. diethylaminoethyl acrylate methylsulphate, vinyl methyl ether, vinyl ethyl ether, and alkali metal and ammonium salts of vinyl sulphonic acid.

The redox system used in the method of the invention can be based on, for example, a persulphate, e.g. a system comprising potassium persulphate and sodium sulphite or $NaH[Fe^{II}(EDTA)]$, or on hydrogen peroxide, e.g. a system comprising hydrogen peroxide and $$NaH[Fe^{II}(EDTA)]$$

The azo compound free-radical source used in the method of the invention can be, for example, azobisisobutyronitrile (AZBN).

The quantities of the individual components of the initiator which are used will vary according to the materials used and the process conditions. Thus, when using a redox system which is based on persulphate, there will advantageously be used an amount of the persulphate not exceeding 100 parts per million and most preferably below 50 parts per million, based on the total weight of the aqueous solution containing the monomeric material to be polymerized, and when using, as the azo compound free-radical source, AZBN, there will be used an amount of AZBN in the range of from 100 to 2000 p.p.m., based on the total weight of the aqueous solution containing the monomeric material to be polymerized.

As indicated above, the aqueous solution may contain a single monomer, e.g. sodium acrylate, or a mixture of copolymerizable monomers, e.g. sodium acrylate and acrylamide.

The polymerization of the monomer(s) present in the aqueous solution can be effected under conditions conventionally used in the art; thus, for example, in one procedure the aqueous solution of the monomer(s) and the apparatus is purged with $N_2$ or $CO_2$ or other inert gas before the addition of the polymerization initiator.

The invention is further illustrated by the following examples in which there were used normal commercially available materials containing trace amounts of iron which activate the redox system.

EXAMPLE 1

There was prepared an aqueous solution containing 15% by weight or acrylamide and 15% by weight of sodium acrylate. Three 200 gram quantities of this solution, (A), (B) and (C), contained in vacuum flasks were purged for ten minutes with nitrogen containing less than one part per million of oxygen and then the following polymerization initiators were added thereto.

Solution: Initiator
- Solution (A) ____ 1000 p.p.m. potassium persulphate and 50 p.p.m. sodium sulphite.
- Solution (B) ____ 50 p.p.m. potassium persulphate and 50 p.p.m. sodium sulphite.
- Solution (C) ____ 50 p.p.m. potassium persulphate and 50 p.p.m. sodium sulphite. 1000 p.p.m. azobisisobutyronitrile (AZBN).

The solutions were then allowed to polymerize. The polymer gels formed after 24 hours were examined. 3.3 grams of each gel were stirred gently with 97.6 cc. of water for 24 hours and the resulting materials were examined for free monomer. It was found that the polymeric material formed from solution (A) contained less than 0.1% of free monomer but had not gone into solution, being cross-linked; that the polymeric material formed from solution (B) contained 5% of free monomer and had gone completely into solution, viscosity measurements indicating a molecular weight in excess of 5 million; and that the polymeric material formed from solution (C) contained less than 0.1% of free monomer and had gone completely into solution, viscosity measurements indicating a molecular weight in excess of 10 million.

EXAMPLE 2

The procedure described in Example 1 was repeated using an aqueous solution containing 6% by weight of diethylaminoethylacrylate methylsulphate and 24% by weight of acrylamide. The products were examined as described in Example 1 and were found to have similar properties except that solution (B) contained 9% of free monomer.

EXAMPLE 3

The procedure described in Example 1 was repeated using two quantities, (A) and (B), of an aqueous solution containing 10% by weight of sodium acrylate and 20% by weight of acrylamide and employing the following polymerization initiators:

Solution: Initiator
- Solution (A) ____ 30 p.p.m. NaH[Fe$^{II}$(EDTA)] and 5 p.p.m. of 100 vol. hydrogen peroxide solution.
- Solution (B) ____ 30 p.p.m. NaH[Fe$^{II}$(EDTA)] and 5 p.p.m. of 100 vol. hydrogen peroxide solution, and 500 p.p.m. of AZBN.

The polymeric materials formed on allowing the solutions to polymerize were examined and it was found that, in the case of solution (A), a viscous solution containing 45% of free monomer was obtained and, in the case of solution (B), a stiff gel containing less than 0.5% by weight of free monomer and having a molecular weight greater than 5 million was obtained.

What is claimed is:
1. A method of manufacturing a water-soluble very high polymer substantially free from water-insoluble polymer impurities which comprises maintaining under polymerization conditions an aqueous solution containing:
   (a) at least one ethylenically-unsaturated monomer;
   (b) a persulfate or hydrogen peroxide redox system; and
   (c) azobisisobutyronitrile;
the component (c) being a polymerization initiator added concurrently with component (b) and present to complete polymerization of all the monomer (a) which is not polymerized by polymerization initiator component (b).

2. A method according to claim 1 wherein the monomers under (a) are selected from the group consisting of acrylic acid, methacrylic acid, acrylamide, methacrylamide, methyl acrylate, ethyl acrylate, methyl methacrylate, ethyl methacrylate and diethylaminoethyl acrylate, hydroxyethylmethacrylate, alkali metal and ammonium salts of acrylic acid and methacrylic acid, vinyl methyl ether, vinyl ethyl ether, alkali metal and ammonium salts of vinyl sulphonic acid, and quaternary ammonium salts of aminoalkyl esters of acrylic acid or methacrylic acid.

3. A method according to claim 2, wherein component (b) is selected from the group consisting of
   a persulfate and a sulfite;
   hydrogen peroxide and NaH[Fe$^{II}$(EDTA)]; and
   a persulfate and NaH[Fe$^{II}$(EDTA)].

4. A method according to claim 3, wherein component (b) comprises a persulfate and a sulfite.

5. A method according to claim 3, wherein component (b) comprises hydrogen peroxide and NaH[Fe$^{II}$(EDTA)].

6. A method according to claim 3, wherein component (b) comprises a persulfate and NaH[Fe$^{II}$(EDTA)].

7. A method according to claim 3, wherein the monomers of component (a) are selected from the group consisting of acrylamide and alkali metal salts of acrylic acid.

8. A method according to claim 3, wherein the monomers of component (a) are selected from the group consisting of methacrylamide and alkali metal salts of methacrylic acid.

9. A method according to claim 3, wherein the monomers of component (a) are selected from the group consisting of acrylamide and a quaternary ammonium salt of an amino alkyl ester of acrylic acid or methacrylic acid.

References Cited

UNITED STATES PATENTS

| | | | |
|---|---|---|---|
| 3,414,547 | 12/1968 | Thompson | 260—78.5 |
| 2,471,959 | 5/1949 | Hunt | 260—89.5 |
| 3,405,106 | 10/1968 | Scanley | 260—80 |
| 2,933,467 | 4/1960 | Borunsky | 260—27 |
| 2,983,717 | 5/1961 | Henley et al. | 260—80.3 |

FOREIGN PATENTS

| | | | |
|---|---|---|---|
| 1,357,736 | 3/1964 | France | 260—80 |

JOSEPH L. SCHOFER, Primary Examiner

C. A. HENDERSON, Jr., Assistant Examiner

U.S. Cl. X.R.
260—80, 80.3, 86.1, 89.5, 89.7, 91.1